//
Jan. 7, 1969 G. A. CORMAN 3,421,078
METHOD AND APPARATUS FOR MEASURING THE THICKNESS OF AN INSULATING
LAYER BY VARIATION OF THE DIELECTRIC OF A CONDENSER
USING A CONTACTING ELECTRODE
Filed Jan. 7, 1966
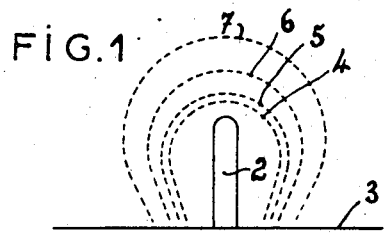
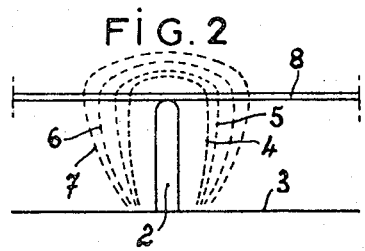
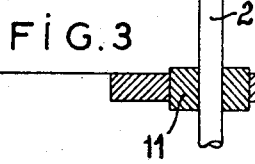
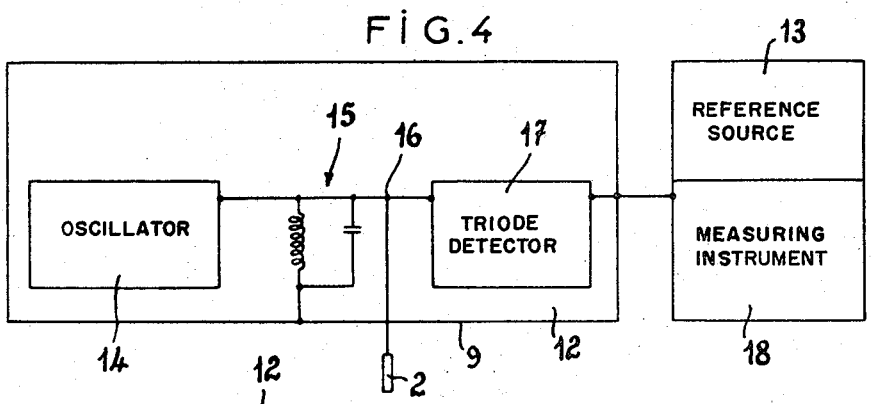
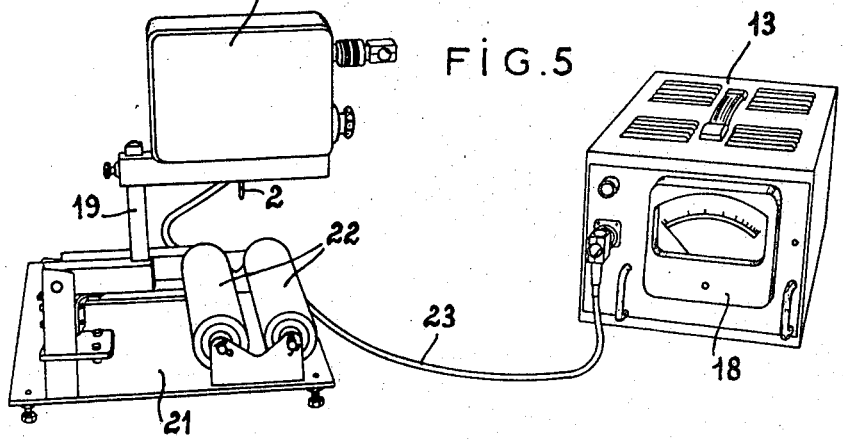

United States Patent Office 3,421,078
Patented Jan. 7, 1969

---

3,421,078
METHOD AND APPARATUS FOR MEASURING THE THICKNESS OF AN INSULATING LAYER BY VARIATION OF THE DIELECTRIC OF A CONDENSER USING A CONTACTING ELECTRODE
Guy Albert Corman, Lyon, France, assignor to Verrerie Souchon-Neuvesel, Societe Anonyme, Lyon, Rhone, France
Filed Jan 7, 1966, Ser. No. 519,260
Claims priority, application France, Jan. 13, 1965, 45,505
U.S. Cl. 324—61    3 Claims
Int. Cl. G01r 27/26

---

ABSTRACT OF THE DISCLOSURE

A method and apparatus for measuring the thickness of an insulating layer by means of a condenser constituted by a metal part provided with a perforation and an electrode passing through the perforation in an electrically insulated condition. The electrode is subjected to a difference in voltage with reference to the metal part and when an insulating layer whose thickness is to be measured is applied to the end of the electrode and perpendicularly thereto, the modification in capacity between the electrode and metal part can be measured by an instrument adapted to directly indicate the thickness of the insulating layer.

---

Starting, on the one hand, from the modifications in capacity between two plates or electrodes as a function of the thickness of a dielectric insulating layer separating said two electrodes and, on the other hand, from the possibilities of measuring the modifications of said capacity, the present invention is directed to a method for measuring the thickness of an insulating layer, which method consists in applying a single plate or electrode over said insulating layer and in measuring the modifications in the capacity of said electrode with reference to a carrier plate, which modifications depend on the thickness of said insulating layer.

The apparatus for executing said method includes a measuring box formed by a metal casing through one of the surfaces of which passes a measuring electrode the size of which is small when compared with the metal surface of the casing and which is subjected to a voltage with reference to said casing without any electrical contact between said measuring electrode and said metal casing while the box itself is associated with a feeding block incorporating the control board for the apparatus and the measuring instrument.

When the measuring electrode is energized, there is produced an electric field of which the equipotential lines extend along paths defined by the shape of the electrode and its position with reference to the casing. If a plate of insulating material is laid over the electrode in a plane perpendicular thereto, the equipotential lines are deformed and this deformation is more marked on the plate, since the lines of force of the electric field have a tendency to pass through the dielectric plate.

This phenomenon results in a modification of the capacity, depending on the thickness of the plate and on its nature. It is then sufficient to gauge the apparatus according to the nature of the plate, so that it is possible to ascertain the thickness of the latter by measuring said modification in capacity.

The apparatus for executing said method is such that only the capacity varies during the measuring operation.

The present invention will be readily understood from a reading of the following description, reference being made to the accompanying drawings illustrating said method and showing by way of example in a nonlimiting sense, a preferred embodiment of an apparatus for the execution of the method according to the invention. In said drawings:

FIG. 1 shows the equipotential lines of the electric field appearing in the gap separating an electrode from a metal plate and across which a voltage is applied, FIG. 2 illustrates the deformations of the equipotential lines of the electric field of FIG. 1, after insertion of an insulating plate perpendicularly over the free end of the electrode, FIG. 3 is a partial sectional view of the measuring box, FIG. 4 is a wiring diagram which may serve for the operation of said apparatus, FIG. 5 illustrates an embodiment of said apparatus in the case of its application to the measurement of the thickness of the walls of glass bottles.

As apparent from inspection of FIG. 1, when a voltage is applied between an electrode 2 and a metal plate 3 through which the electrode 2 extends perpendicularly without any electric contact therewith, there is thus produced an electric field of which the equipotential lines are illustrated at 4, 5, 6 and 7.

If now there is inserted in a direction perpendicular to the electrode 2 a plate of insulating material 8, the equipotential lines 4 to 7 are deformed in the vicinity of said plate 8. Said deformation is more marked along the plate 8 and shows that the lines of force of the electric field have a tendency to pass through the dielectric formed by the plate 8, as shown in FIG. 2.

As a result, the capacity varies as a function of the thickness of the plate 8 and of its nature.

In the case of plates of the same nature, but of different thicknesses, said modification in capacity does not follow a linear law and thus the modification obtained with a plate of insulating material of a thickness of 1 mm. is equal to 40% of that obtained with a plate of the same nature the thickness of which is 10 mm.

Furthermore, in order to obtain a valid result, it is necessary for the thickness of the plate to be constant throughout a radius which is a function of the size of the electrode 2 and of the metal plate 3.

FIG. 3 shows partly the measuring box allowing the execution of the method according to the invention.

The casing 9 of said box is made of metal and through a wall thereof extends an electrode 2 perpendicular to said wall and without any electric contact therewith as provided by the insulating washer 11.

The length of the electrode 2 should be limited as much as possible with reference to the size of the metal surface of the casing 9 of the box surrounding it, so as to limit the radiation of the electric field towards other surrounding metal parts, which are not connected mechanically with the electrode. This allows reducing the variable parasitic capacities and the effects due to the presence of the operator.

The diameter of the end of the electrode 2 is defined on the one hand as a function of the size of the area of the insulating plate, the thickness of which is to be measured, and on the other hand as a function of the fineness and accuracy required for the measurement.

The apparatus illustrated in FIG. 4 includes two elements, the measuring box 12 and the feeding block 13. The measuring box encloses a tri-tet oscillator 14 piloted by a quartz and associated with the pentode section of a pentode triode. An oscillating circuit 15 tuned to the second harmonic of the quartz is located in the anode circuit of the tube. The measuring electrode 2 is connected with the hot point 16 of said circuit. Thus, the capacity measured detunes more or less said circuit. The A.C. voltage collected is fed to the grid of the triode 17 forming a cathodyne and rectifier. The rectified voltage is compared in the feeding block 13 with a reference D.C.

voltage. The difference between said two voltages acts on a measuring instrument 18 incorporated with the feeding block 13, and the scale of which directly indicates the thickness to be measured in millimeters.

In the case of an automatic apparatus, said difference in voltage may serve directly for the control of an external circuit.

A particularly interesting application of the method disclosed relates to the measurement of the thickness of the wall of a glass bottle or flask.

FIG. 5 illustrates an embodiment of an apparatus adapted for such an application. The measuring box 12 is carried by a bracket 19 rigid with a frame 21. Two rollers 22 having parallel horizontal axes, extend underneath the box 12 in a manner such that the electrode 2 is in a vertical registry with the middle of the gap between the rollers. A cable 23 connects the measuring box 12 with the feeding block 13 with which is incorporated the measuring instrument 18.

The operator inserts in succession each bottle to be tested in the cradle formed by the rollers 22 and lowers the casing 12 until the electrode 2 is in contacting relationship with the wall of said bottle.

The measuring instrument 18 immediately indicates the thickness of the bottle wall. It is therefore possible to be immediately aware of a possible flaw in the production of the bottles and to modify instantaneously the conditions of operation of the producing machine, so as to prevent the appearance of such flaws.

Obviously, the invention is not limited to the sole embodiment of said apparatus which has been described hereinabove, by way of a nonlimiting example and it covers in contradistinction all the modifications thereof falling within the scope of the accompanying claims.

What I claim is:
1. A method for measuring the thickness of an insulating layer by means of a condenser constituted by a metal part provided with a perforation and an electrode passing through said perforation and beyond said metal part in an electrically insulated condition, said method consisting in subjecting the electrode to a difference in voltage with reference to said metal part, applying to only the end of the electrode projecting out of said part and perpendicularly thereto the layer of thickness of which is to be measured, and measuring the modification in capacity between the electrode and said metal part as a consequence of the application of said layer on the end of the electrode.

2. An apparatus for measuring the thickness of an insulating layer comprising a metal casing provided with a perforation, an electrode of a cross-section which is small with reference to the area of the casing as measured in a direction perpendicular to the electrode, said electrode passing through said perforation and extending beyond said casing in an electrically insulated condition and the end of said electrode projecting out of the casing being adapted to be engaged by the insulating layer whose thickness is to be measured, means for applying a voltage between the electrode and the casing, a circuit subjected to the modifications in voltage arising through the modifications in capacity of the electrode with reference to the casing, as produced by the application of the layer on only the electrode, and a measuring instrument controlled by said circuit.

3. An apparatus as claimed in claim 2, wherein said electrode is a cylindrical probe having a rounded end.

References Cited

UNITED STATES PATENTS 2,428,700  10/1947  Eilenberger _____ 324—61

FOREIGN PATENTS 647,621  8/1962  Canada.

OTHER REFERENCES

Schwirzer, German printed application No. 1,081,677, pub. May 12, 1960 (1 sht. dwg. 2 pp. spec.), class 324–61.

RUDOLPH V. ROLINEC, *Primary Examiner.*

E. E. KUBASIEWICZ, *Asisstant Examiner.*